United States Patent [19]

Lamb

[11] Patent Number: 4,563,034
[45] Date of Patent: Jan. 7, 1986

[54] RETRACTABLE TRUCK BED COVER FOR PICK-UPS

[76] Inventor: Joe H. Lamb, 117 W. Fireclay Ave., Salt Lake City, Utah 84107

[21] Appl. No.: 634,750

[22] Filed: Jul. 26, 1984

Related U.S. Application Data

[63] Continuation-in-part of Ser. No. 496,014, May 19, 1983, abandoned.

[51] Int. Cl.⁴ .............................................. B60J 7/10
[52] U.S. Cl. ..................................... 296/98; 166/266
[58] Field of Search ................. 296/98, 100, 105; 160/266, 267 R, 267 G, 268 R, 268 S, 273, 23 R

[56] References Cited

U.S. PATENT DOCUMENTS

| | | | |
|---|---|---|---|
| 2,898,607 | 8/1959 | McGuire | 160/23 R |
| 3,146,824 | 9/1964 | Veilleux | 296/98 |
| 3,467,431 | 9/1969 | Turcotte | 296/98 |
| 3,768,540 | 10/1973 | McSwain | 296/105 |
| 3,774,958 | 11/1973 | Thorpe | 296/98 |
| 4,273,377 | 6/1981 | Alexander | 296/100 |

Primary Examiner—Robert R. Song
Attorney, Agent, or Firm—Richard F. Bojanowski

[57] ABSTRACT

A retractable cover designed for use in covering the bed of a conventional pick up truck. The cover includes a pair of beaded side edges wherein each of the beaded side edges slidably engage a track or longitudinal opening molded in a slide member mounted to the side walls of a bed on a pick up truck. One end of the cover is fixed to a spring loaded, continuously biased, roller rotatably mounted to the forward section of the truck's bed in a plane below the plane of the extended truck cover. A flap is also provided to cover the roller as well as a means to seal the flap to the truck cover when fully extended. A locking mechanism is fixed at or near the tailgate of the truck's bed to maintain the extended, spring biased, cover in an extended and locked position.

11 Claims, 4 Drawing Figures

RETRACTABLE TRUCK BED COVER FOR PICK-UPS

PRIOR PATENT APPLICATION

This patent application is a continuation-in-part of patent application Ser. No. 496,014, filed on May 19, 1983, now abandoned. The inventor is the same in both applications.

FIELD OF THE INVENTION

Canvass or plastic type materials are customarily used for covering and enclosing the bed of a pick up truck. Some of these covers are positioned and secured in place by ropes or ties attached to the cover. The ropes or ties are then fixed to the truck's bed in a conventional manner. A more sophisticated method for attaching the cover to the truck's bed is by the use of snap buttons imbedded along the side edges of the cover and corresponding receptors fixed to the bed of a pick up truck.

Although both of these approaches achieve the purpose intended, there is one major disadvantage associated with each. Substantial time is required to cover and uncover the truck's bed. The ties or ropes must be individually tied and untied and the buttons must be individually snapped and unsnapped before the cover can be securely positioned over or removed from the truck's bed.

These disadvantages can be overcome by the truck bed cover of this invention. In addition, the cover of this invention provides a simple yet effective means for protecting the contents carried in the truck's bed from the elements such as rain, snow, dirt or heat. It is also valuable in preventing the contents of a truck's bed from being ejected during transport, particularly, if the truck is traveling over rough terrain.

Motorized swimming pool covers disclosed in U.S. Pat. Nos. 3,979,782 and 3,053,232 include features which are related to those used on the truck bed cover described in this invention.

OBJECTS, ADVANTAGES AND SUMMARY OF THE INVENTION

It is, therefore, an object of this invention to provide a truck bed cover that can be easily extended or retracted in a matter of seconds.

Another object is to provide a retractable truck bed cover mechanism which can be easily mounted to the bed of a pick-up truck.

Still another object of this invention is to provide a truck bed cover which is strong, durable and economical to produce.

Still another object of this invention is to provide a retractable truck bed cover wherein the retracting mechanism is recessed and protected within the truck's bed.

Another object of this invention is to provide a truck cover which, when extended, seals the truck bed from debris, water and other unwanted matter.

In summary, a preferred embodiment of this invention comprises a flexible, impervious cover having beaded longitudinal side edges capable of slidably engaging a pair of tracks or longitudinal openings formed in a slide member. The slide members are mounted in parallel relation to the side walls comprising the truck's bed. One end of the cover is fixed to a spring loaded cylindrical roller rotatably mounted to the forward section of the truck's bed in a plane beneath the plane of the extended cover. The cylindrical roller is rotatably contained within journaled end members fixed to brackets which in turn are mounted to the sidewalls of the truck's bed. A reinforced stiff flap is fixed to the forward vertical wall of the truck's bed to cover the journaled cyclindrical roller. The forward end of the flap contains a compressible ledge extending the width of the flap. This ledge is designed to receive a lip fixed to the top side of the truck cover when the cover is fully extended. The flap in combination with the extended cover provides a means for enclosing the bed of a pick up truck as well as enclosing the spring biased cylindrical drum.

A locking means is also provided in proximity to the tail gate of the truck's bed for retaining the leading edge of the spring biased cover in an extended and immobilized position. The leading edge of the truck's cover is sewn to provide a pocket for receiving an elongated rod extending the width of the truck's bed. The elongated rod provides rigidity to the cover's leading edge facilitating its placement in communication with the locking means. In some cases, it is preferred to have a guide means or nylon sleeve positioned at the tail gate end of the slide means to assist in guiding the beaded edges of the bed's cover into the fixed track or longitudinal opening. Another feature which may be incorporated into the cover of this invention is a retractable line centrally positioned to the cover's leading edge to facilitate the extension of the cover over the truck's bed by a single individual. Other features which may be incorporated, as alternatives or additions to the embodiment shown, include the use of a cylindrical cover collecting roller having a reduced diameter at its end sections for receiving the beaded portion of the truck bed cover. This reduced diameter provides a type of well which collects the bead and prevents a cover build up along the ends of the cylindrical roller.

DETAILED DESCRIPTION OF THE PREFERRED EMBODIMENT

Figure 1:
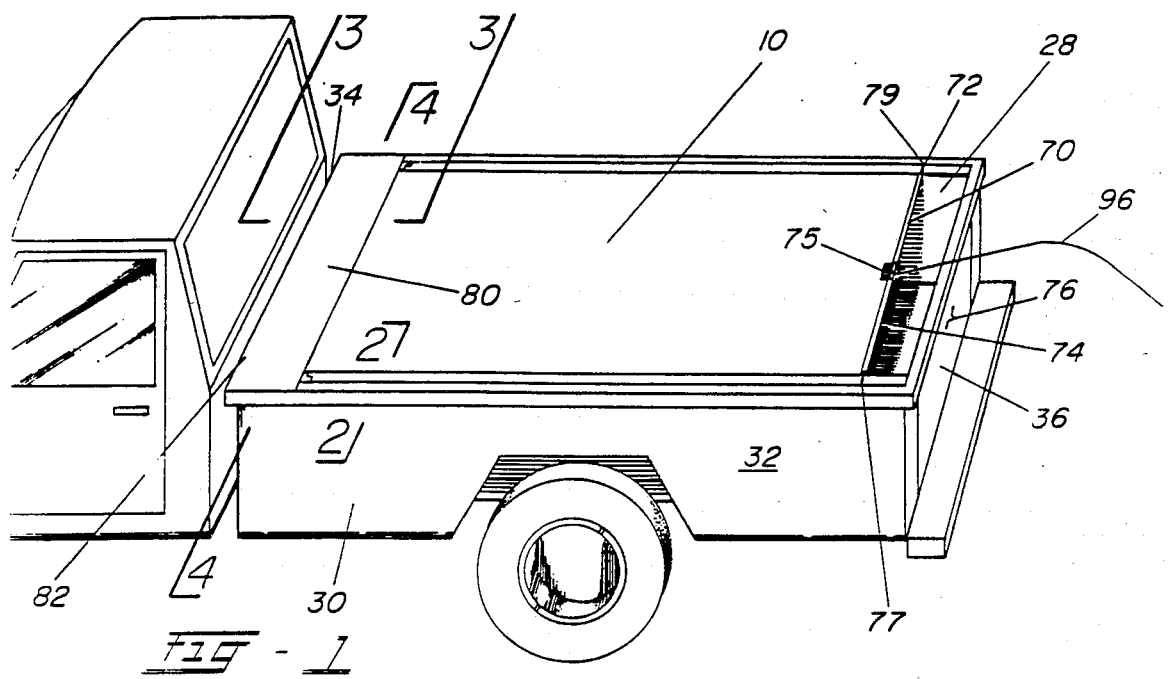
FIG. 1 is a partial isometric view of a pickup truck and its bed with the cover of this invention in a partially extended position.

The truck bed cover of this invention, which is hereinafter described, is exemplary of one of the preferred embodiments which can be used. Such embodiment comprises generally a flexible impervious cover 10 having left and right beaded side edges 12 and 14 respectively. The beaded side edges are formed by sewing, gluing, heat sealing or otherwise securing a flexible reinforcing member 16 along the folded side edges 18 of the cover 10. This can be conveniently achieved by, for example, fixing a draw cord 20 between the side folds of a cover and securing the folds around the draw cord by sewing. The beaded edges of the cover extend along the entire length of both sides of the cover.

The rear edge of the cover 10 is fixed to a cylindrical drum 22 which is rotatably mounted at each of its axle ends 24 and 26 to the side walls 28 and 30 of a truck bed, through intermediate brackets 29 and 31, shown generally by the number 32. The truck bed 32 also contains a standard forward wall 34 and a pivotally mounted rear wall means generally referred to as a tail gate 36. The tail gate 36 contains standard latching or locking means (not shown) for maintaining the tail gate in a locked vertical position.

The cylindrical drum 22 comprises a light weight metallic tube 23 closed at each of its ends with a pair of form fitting end caps 37 and 38 adapted to enter the open ends of the tube 23. The caps and the outer face of each of the caps are designed to receive and hold a series of plates and journaling means 39 and 40 to facilitate rotation of the drum about axels 24 and 26.

Within the hollow tube is a stationary dowel 41 fixed to the axels 24 and 26 through reduced end sections 46 and 48. A loose fitting helical spring 42 circumscribes the dowel 41 with one of the ends 44 of the spring 42 being fixed to the dowel 41 with a staple 47. The other end 45 of the spring 42 is fixed to the rotating cap 37 by conventional means.

As the cover is unrolled or pulled toward the tail gate of the truck's bed, the helical spring 42 is tightened about the stationary dowel 41 by rotation of the cylindrical drum 22. As the cover is extended toward its limit, the tension of the spring is increased creating an increased reverse force urging the cover back toward the cylindrical roller.

The outer wall of the cylindrical drum 22 contains a molded, generally circular, concave depression or groove 50 extending longitudinally along the entire length of the cylindrical drum. The mouth or opening of the groove 52 is designed to receive a beaded forward edge 53 of the cover 10 constructed in a fashion similar to the beaded side edges 12 and 14. The forward edge of the cover 10 is thereby fixed to the outside wall of the cylindrical drum 22. As the drum is rotated, the cover can be rolled and collected thereon.

Figure 2:
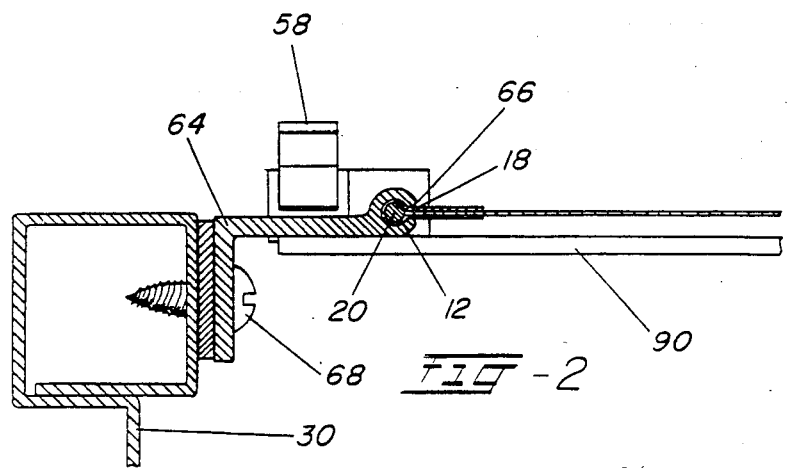
FIG. 2 is a partial cross sectional view taken along line 2—2 of FIG. 1 showing the slide member in communication with the cover's beaded edges.

Mounted on top or perferably along each of the inner side walls 28 and 30 of the truck bed 32 are a pair of slide members 64 having a track or longitudinal "C" shaped opening 66 formed in the slide members 64 as shown in FIG. 2. These tracks 66 are adapted to receive for slidable movement, the beaded side edges 12 and 14 of the cover 10. Preferably, the slide members are fixed to the truck's bed side walls so that the flexible cover can be positioned in a plane very close to a horizontal plane generated by the tops of the truck bed's vertical walls. This can best be accomplished by employing slide members whereby the track or longitudinal "C" shaped openings are in a plane slightly below a plane generated by the top edges of the truck bed's vertical walls. The slide member shown in FIG. 2 is designed to be mounted along the inner side walls of the truck's bed by screws 68. However, other types of slide members could be used.

The forward or leading edge 70 of the cover 10 is wrapped or folded over a cylindrical rod 72 to form a rigid leading edge 74 through an opening 75 in the cover, the cylindrical rod 72 can be placed in communication with a lock loop 76 mounted at or near the tailgate 36. Since the cover is continually being urged rearwardly by the helical spring 42 mounted within the cylindrical drum 22, the rod comprising the rigid leading edge 74 of the cover 10 is firmly held within the lock loop maintaining the cover in a taut and extended position. Other methods and techniques may, however, be used to securely hold the cover in its full extension.

When the cover is fully retracted or when the cover has been rolled on the drum, the exposed ends 77 and 79 of the rod 72 are inserted into the receiving end 56 of a stop member 58 mounted to the top of each of the side walls 28 and 30 of the truck's bed. This prevents the truck's cover from being collected on the cyclindrical drum beyond a preselected point.

In addition to the above features, the truck bed cover includes a rigid flap member 80 fixed along its rear edge 82 to the top edge of the truck bed's forward wall 34. This rigid flap is of such densions that is capable of overlying the cylindrical drum 22 carrying the truck cover 10.

Figure 3:
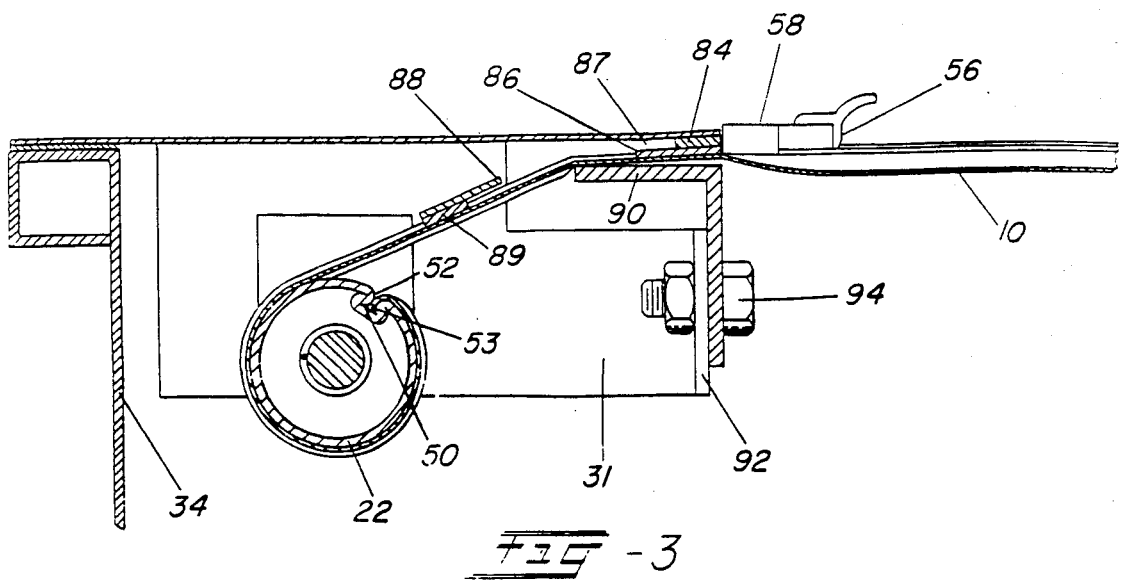
FIG. 3 is a partial cross sectional view taken along lines 3—3 of FIG. 1 showing primarily that area between the bottom of the cylindrical roller and the top of the flap member.
Figure 4:
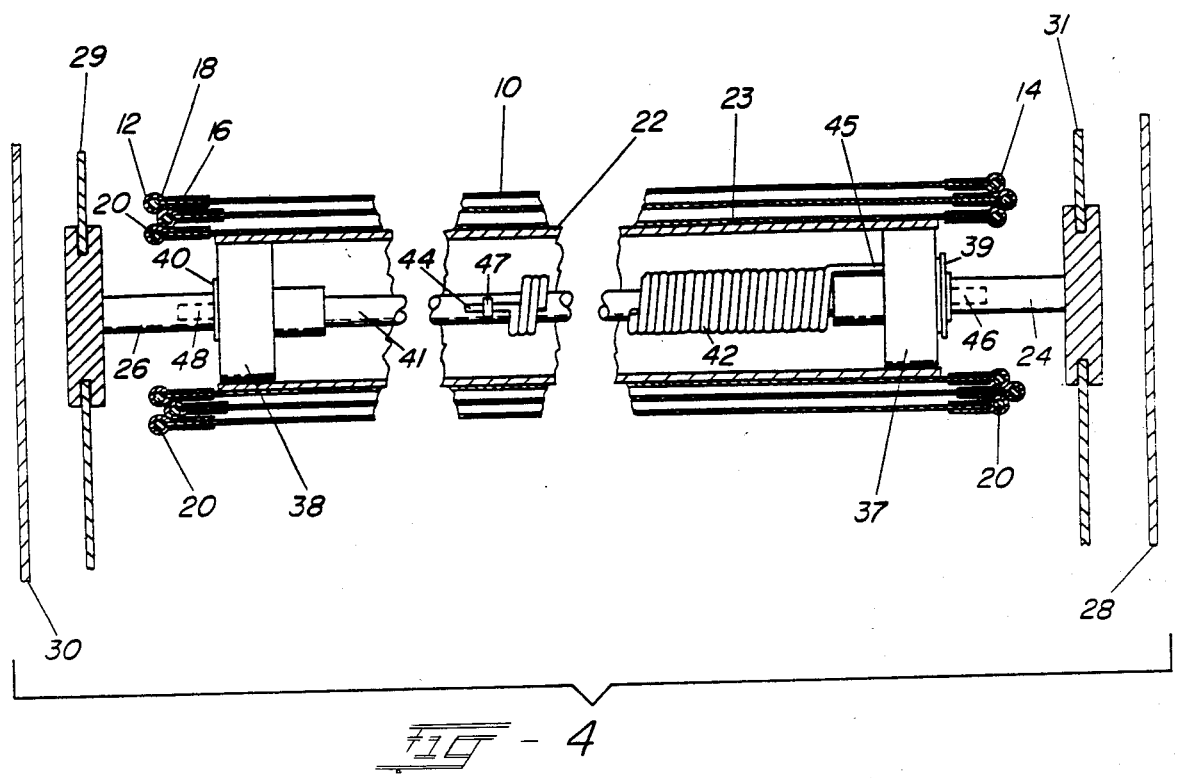
FIG. 4 is a partial cross sectional view taken along line 4—4 of FIG. 1 exposing the drum's spring mechanism.

As shown in FIG. 3, the forward section of the flap member 82 contains a cushion like base member 84 extending the entire width of the truck's cover. Fixed to the base member 84 is a rigid yet flexible lip member 86 extending beyond the rear edge of the base member to provide an under hanging sealing space 87. The sealing space 87 provided by the under hang is adapted to receive a tongue like member 88 fixed along the top of the truck cover 10 through an intermediate base member 89 when the cover is fully extended. This tongue like flap 88 is secured to the base member 89 which in turn is secured to the top of the cover by sewing, gluing or the like. The placement of the base and tongue member on the cover is such that it may engage the space 87 provided by the under hang when the cover is fully extended. Engagement of the tongue 88 in the underhanging sealing means 87 seals the flap to the truck cover reducing, if not eliminating, the possibility of water leaking into the truck's bed.

To provide support for the above described sealing technique, an L-shaped supporting bar 90 is positioned in an area beneath the sealing space 87 and fixed at its ends to extensions 92 on brackets 29 and 31 by bolts 94. This bar tends to urge the cover upward as the cover is extended to support and more readily permit engagement of the tongue within the sealing means.

In operation, the spring biased truck bed cover is extended by grasping the rigid leading edge of the cover and pulling the cover toward the tailgate of the truck. The cover's beaded side edges slidably move through the track of the slide member. As the cover is unrolled from the rotatable cylindrical drum, the helical spring fixed at one of its ends to the stationary dowel or rod is placed under tension. This tension continually urges the cylindrical drum back to its rest position. After the cover is fully extended the leading edge of the cover is locked into its extended position by inserting the rod of the cover's leading edge into the locking means or lock loop located near the tailgate of the truck's bed. This maintains the cover in an extended position while at the same time being continually urged rearwardly toward the biased cylindrical drum. This biased condition tends to minimize, if not totally avoid, the flapping and snapping effect that other non-baised covers create when the truck is moving at higher rates of speed.

As the truck cover approaches its fully extended position, the tongue attached to the top of the truck cover engages the sealing space provided on the rigid flap fixed to the forward wall of the truck's bed.

A feature which may also be included in the truck cover heretofore described is that a retractable line 96 may be attached to the covers leading edge to facilitate extension of the cover over the truck's bed. Another feature which may be included is an eye fixed centrally along the covers leading edge such that it may communicate with a second eye fixed to the tail gate of the truck's bed. With the eyes in communication, a locking device may be inserted through both eyes and thereby lock the cover in an extended position and secure the contents carried within the truck's bed.

Another modification which may be incorporated is to have the ends of the cylindrical drums reduced in size or diameter and, thereby, permit an area for receiving the cover's beaded side edges. This arrangement prevents a build up of the cover along the edges of the drum during the time the cover is collected on the cylindrical drum.

It should be understood that the foregoing descriptions are for illustrative purposes and no limitations are thereby intended except for those specifically recited in the claims appended hereto.

I claim:

1. A cover for enclosing a bed of a truck having two side walls, a forward wall and a tailgate wall comprising a flexible impervious cover having a rigid leading edge, a rear section and two parallel beaded side edges for slidably engaging a pair of parallel tracks, one fixed to each of the side walls, said cover's rear section being fixed to a biased rotatable drum mounted to the said bed's side walls in a plane below a plane generated by the walls of said truck's bed, a holding means for retaining said cover fully extended, a flap fixed to said forward wall for extending over said biased rotatable drum said flap having an underhang sealing space for receiving and engaging a tongue fixed to the top side of said cover when said cover is fully extended.

2. The truck cover of claim 1 wherein each of said tracks is attached to a bracket for mounting to said side walls.

3. The truck cover of claim 1 wherein said rotatable drum is spring biased.

4. The truck cover of claim 1 wherein the forward end of said track includes a guide means for assisting said beaded side edges into said track.

5. The truck cover of claim 2 wherein said bracket is mounted to the inner section of said truck's side walls.

6. The truck cover of claim 1 including a means for securing said extended cover to said truck's bed with a locking means.

7. The truck cover of claim 1 wherein said holding means comprises an element fixed to the tail gate wall of said bed said element having a means for receiving and holding said cover's rigid leading edge.

8. The truck cover of claim 1 wherein said underhang sealing space comprises a cushioned base member and a lip member fixed thereto to provide an underhang.

9. The truck cover of claim 8 wherein said flap is relatively rigid and is fixed at or near its rear edge to the top of said bed's forward wall.

10. The truck cover of claim 1 wherein a cover support bar is provided to urge said tongue upward and into engagement with said underhang sealing space.

11. In combination with a truck bed having two side walls, a forward wall and a tail gate wall and a truck bed cover comprising a flexible impervious cover having a rigid leading edge, a rear section and two parallel beaded side edges for slidably engaging a pair of parallel tracks, one fixed to each of the side walls, said cover's rear section being fixed to a biased rotatable drum mounted to the said bed's side walls in a plane below a plane generated by the walls of said truck's bed a holding means for retaining said cover fully extended, a flap fixed to said forward wall for extending over said biased rotatable drum, said flap having an underhang sealing space for receiving and engaging a tongue fixed to the top side of said cover when said cover is fully extended.

* * * * *